United States Patent Office 2,817,479
Patented Dec. 24, 1957

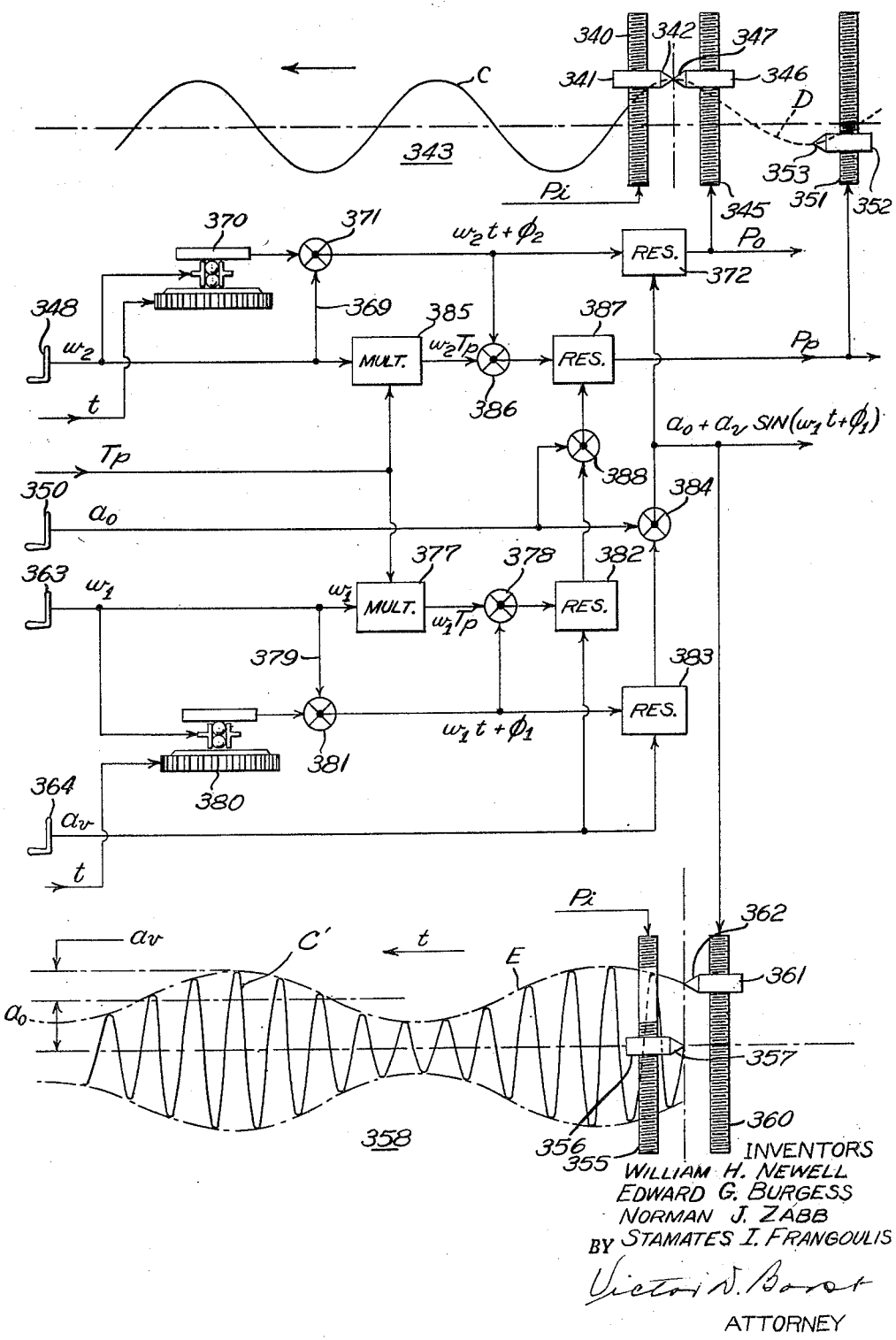

2,817,479

METHOD AND DEVICE FOR PREDICTING VALUES OF A FLUCTUATING SYSTEM AT A PREDETERMINED FUTURE TIME

William H. Newell, Mount Vernon, Edward G. Burgess, Jr., Kew Gardens, Norman J. Zabb, Brooklyn, and Stamates I. Frangoulis, Flushing, N. Y., assignors to Sperry Rand Corporation, a corporation of Delaware Original application May 29, 1953, Serial No. 358,324. Divided and this application February 28, 1955, Serial No. 490,766

6 Claims. (Cl. 235—61)

The present application is a division of application Serial No. 358,324 filed May 29, 1953.

The present invention relates to a method and apparatus for computing the characteristics of a fluctuating system for a predetermined future period and for predicting the value of a quantity at the end of said period, even though the mathematical form of said system is varying, and although the invention has a wide range of utility, it is particularly useful in predicting the pitch angle (deck tilt) and the heave (deck level) of a floating platform, such as the flight deck of a carrier, at a future predetermined time.

In guiding an airplane in its approach towards a floating platform, such as the deck of a carrier for landing, it is necessary to predict the future time of landing and the pitch angle and heave or level of the deck at the predicted time, to assure safe landing. Since the carrier is continuously oscillating in pitch and has a continuous oscillating vertical movement during the approach of the airplane, it becomes necessary to compute continuously the characteristics of the fluctuating motions of the carrier and to predict therefrom the pitch and heave of the carrier at the future predicted time of landing. Since the movement of the deck does not follow a uniform mathematical pattern or equation, it is seen that the matter of determining with accuracy the pitch and heave at a future time is not a simple problem.

One object of the present invention is to provide a novel method and device by which the value of a quantity at a predetermined future time in a fluctuating system may be predicted, even though the mathematical form of the system may be continuously varying and the variations in the system may not be followed a definite mathematical formula.

Another object is to provide a novel method and device by which the future pitch angle of a floating platform, such as the flight deck of a carrier, at the predicted future instant of landing can be computed and predicted.

A further object is to provide a novel method and device by which the future heave or flight deck level of a floating platform, such as that of a carrier at the predicted future instant of landing can be computed and predicted.

In accordance with the present invention, the value of a quantity in a fluctuating system at a future predetermined time can be computed by continuously producing a running record curve of the present value of the quantity, continuously tracking said record curve through an equation mechanizing process by continuously adjusting the input quantities for said mechanizing process, and from the equation solving action of the mechanizing process determining said future value. In its more limited aspects, the method of the present invention is carried out by continuously producing two running record curves of the present value of the quantity in the fluctuating system and continuously tracking one of these record curves and simultaneously tracing the envelope of the other record curve through an equation mechanizing device, by continuously adjusting the input quantities for said mechanizing device.

For the determination of the pitch angle and deck level of a floating platform at a future predetermined time, running record curves of the present pitch angle and deck level are produced, and these record curves are continuously tracked through respective equation mechanizing processes by continuously adjusting input quantities for said mechanizing processes, and from the equation solving actions of the mechanizing processes determining said future pitch angle and deck level.

Various other objects, features and advantages of the present invention are apparent from the following description and from the accompanying drawing, showing a diagram of a form of pitch prediction computer embodying the present invention, the full lines in the diagram indicating mechanical movements, such as shaft rotations.

To predict the position of a ship's deck at the future instant of landing of an approaching plane, it is required that the time ahead when the plane is expected to land be predicted and then that the position of the deck at this time be predicted. This sequence of predictions is based on the assumption that the pilot has sole control of the plane speed and that the position of the deck at touchdown (the position of the deck where the plane can begin to land) is not preselected.

The time required by a plane to fly from its present position to its position at touchdown on the deck indicated herein by the symbol $T_p$ can be calculated by prediction time computer in the manner described in the aforesaid copending application. For computing the predicted pitch angle of the deck at the predicted time $T_p$ of landing indicated by the symbol $P_p$, it is necessary to determine continuously present pitch angle of the deck indicated by the symbol P or $P_0$.

To supply continuously information on the magnitude of the present ship pitch angle, service of a stable element is required. This stable element could be of any well-known construction. For example, it could be one of the stable elements commmonly employed in connection with firing control systems in warships. There is also the possibility that the stabilizer unit required in connection with the radar antenna drive could also be used to supply continuously the information P or $P_0$.

Having determined a value for the prediction time $T_p$, the second phase of the prediction problem is entered into, namely the deck tilt $P_p$ at the future time $T_p$. Consider first a ship at rest in still water. If now a moment should be applied about an athwartship axis through the center of gravity, some pitch angle, say P would result. Upon removal of this applied moment, the ship would oscillate in pitch about the athwartship axis with decreasing amplitude, the equation of motion being approximately $$I\ddot{P}+C\dot{P}+KP=0 \qquad (18)$$

where I is the effective longitudinal moment of inertia of the ship about the athwartship pitch axis, C is the damping moment coefficient due to skin friction and the like, K is the hydraulic resorting moment coefficient, $\ddot{P}$ is the second derivative of the pitch angle, with respect to time and $\dot{P}$ is the first derivative of the pitch angle with respect to time. Now the period of this oscillation is the pitching period of the ship and is equal to $$T=\frac{2\pi}{w_{np}}=\frac{2\pi}{\sqrt{\frac{K}{I}-\frac{C^2}{4I^2}}}$$

where $w_{np}$ = natural angular frequency of pitch. However, when the ship is in a seaway, the equation of motion (18) becomes $$I\ddot{P} + C\dot{P} + KP = F(t)$$

where $F(t)$ represents the pitch component of the moment applied to the ship by wave action. Now from general observation, it can be said that $F(t)$, although highly variable, will nevertheless at a given hour exhibit a frequency spectrum in which certain narrow bands of frequencies are predominant. From an analyzed recording of pitch angle of various type ships headed into the wind under different sea conditions over extended periods of time, it would be possible to obtain the frequency spectrum of the ship's pitching motion under the conditions existing at the time of the run. From this data, it would be noted that the frequencies of greatest amplitude would correspond to the natural pitch period of the ship, the periods at which the ship is encountering the particular wave systems running at the time, the period of ship roll and the period of heave. The last two periods mentioned would probably be of small import and are included only because of the fact that both rolling and heaving cause an induced pitch. Usually, but not always, there will be a single system of waves running. Furthermore, this system of waves will more often than not be running in nearly the same direction as the wind. Hence, the normal expectation during carrier landing operations is that the ship would be headed in a direction about opposite to that in which the waves are traveling. Considering that the usual period of ocean waves is in the range of 5 to 10 seconds, a ship speed of 25 knots would reduce these periods to the range of 1.8 to 5.5 seconds. It almost seems from these considerations that under such conditions, the only period to be seriously considered in pitch motion would be the natural pitch period. That is, a forcing moment function of 2 second period would have to be of tremendous magnitude to appreciably affect the ship motion in pitch. However, a forcing function of 5 second period might well have an appreciable effect, and of course a longer period forcing function would have still greater influence. Functions having such longer periods would arise if the normal conditions outlined above did not hold—as for example, when the wind is opposite in direction to the sea and the ship is traveling with a following sea.

From the above discussion, it is evident that an exact solution for the equation of motion of the ship is not possible. However, the equation of motion may be represented with sufficient accuracy by the approximation $$I\ddot{P} + KP = F(t) = a \sin (wt + \Phi)$$

where $F(t)$ is a sine function of unknown amplitude $a$, angular frequency $w$ and phase angle $\phi$. The solution of this differential equation is then of the form $$P = a_1 \sin (w_1 t + \phi_1) + a_2 \sin (w_2 t + \phi_2) \quad (20)$$

$w_1$ and $w_2$ being the unknown angular velocities and $\phi_1$ and $\phi_2$ the phase angles of the simple harmonic motions of which the pitch angle is assumed to be composed. This form, involving the six unknown parameters $a_1$, $a_2$, $w_1$, $w_2$, $\phi_1$ and $\phi_2$ therefore represents the time variations of pitch angle. Hence, if these six unknowns and variable parameters can be continuously determined and furthermore if a continuous value of prediction time $T_p$ is available, then the predicted pitch angle is $$P_p = a_1 \sin [w_1(t + T_p) + \phi_1] + a_2 \sin [w_2(t + T_p) + \phi_2] \quad (21)$$

The problem is now therefore reduced to the continuous determination of the six unknown and variable parameters noted above.

If the assumption is made that the frequency of pitch movement is constant during the prediction and also equal to the frequency of pitch movement in the immediate past, then we may track the recorded present pitch angle $P_i$ by means of the output $P_0$ of a component solver which is rotating at the same frequency as the pitch angle. That is, we must manually adjust the two inputs to the component solver, namely $a_0$ (average amplitude of the pitch angle) and $w_2$ (angular velocity of one of the assumed sine wave components of the pitch angle variation), so that $P_0$ is equal to $P_i$ at all times by visual observation. In addition by recording the quantity $P_i$ on a contracted time scale, we may also take into account any evident systematic trends in the magnitude of $P_i$. Thus, if the envelope curve of the contracted recording of $P_i$ is constructed, then the ordinate of this curve will be the amplitude of $P_i$ at any desired time in the past. For purposes of prediction, the equation of this envelope can be approximated by the expression $$a_s = a_0 + a_v \sin (w_1 t + \phi_1) \quad (82)$$

where $a_0$ equals the average amplitude of the pitch angle, $a_v$ equals the amplitude of the variation of the pitch angle and $a_s$ equals the sum of the amplitudes resulting from the formulation (82) as indicated. Therefore, we manually adjust continuously the quantities $w_1$ and $a_v$, so that the recorded quantity $a_s$ traces a curve enveloping approximately the contracted recording of $P_i$. The quantity $a_0$ is introduced by tracking the expanded $P_i$ recording, this tracking being aided by the envelope tracking. Thus we have in accordance with the recognized formula for amplitude modulation $$P_0 = [a_0 + a_v \sin (w_1 t + \phi_1)] \sin (w_2 t + \phi_2) \quad (83)$$

$$P_p = [a_0 + a_v \sin (w_1 t + w_1 T_p + \phi_1)] \sin (w_2 t + w_2 T_p + \phi_2) \quad (84)$$

The manner in which Equations 83 and 84 may be mechanized together with the appropriate recording is shown diagrammatically in the drawing, the full lines therein indicating mechanical motion and especially shaft rotations.

Referring to the drawing, the recording of the present pitch angle $P_i$ is shown effected by means of a shaft screw 340 rotated automatically in response to variations in pitch angle from the stable element and having threaded thereon a collar 341 carrying a marker 342 such as a pen. As the shaft screw 340 rotates in accordance with the pitch angle, the pen 342 held against rotation is carried therealong, while a record sheet 343 moves behind said pen towards the left at a constant rate $t$, thereby generating a curve C on said sheet constituting past and present records of the pitch movement. For manually tracking the curve C as it is generated, there is provided a shaft screw 345 located parallel to and alongside of the shaft screw 340 and threadedly carrying a non-rotatable collar 346 with a marker or pointer 347 adapted to be maintained by manual control in coincidental position with the marker 342 generating the curve C. This shaft screw 345 is manually controlled in a manner to be described from a pair of manual control members 348 and 350, shown in the form of handcranks, and in the operation of determining the predicted pitch angle $P_p$ should be rotated in a manner to match the rate of automatic rotation of the shaft screw 340, and so maintain the curve generating point of marker 347 in registry with marker 342.

To determine the accuracy of prediction, there is provided a shaft screw 351 located parallel to the shaft screws 340 and 345 and threadedly carrying a non-rotatable collar 352 with a marker 353 for recording on the record sheet 343. The marker 353 is horizontally located with respect to the indicators or markers 342 and 347 a distance corresponding to the time $T_p$ and said marker 353 is adapted to generate a predicted pitch curve D preferably of a color different than the color of the marker 342. The shaft screw 351 is rotated by the output $P_p$ of the predicting mechanism, so that the curve C generated by the markers or indicators 342 and 347 should follow the curve D traced in advance by the marker 353, if the operation of the mechanism is proper. The marker 353 therefore acts as a check to determine if the operations are correct and if the predictions are accurate.

Another marking and tracking device constituting part of the pitch predicting system comprises a shaft screw 355 rotated automatically by the quantity $P_1$ and having threaded thereon a non-rotatable collar 356 with a marker 357 for recording on a record sheet 358 moved at a continuous constant rate proportional to $t$ but at a slower rate than the rate of movement of the record sheet 343, to generate a curve C′ similar to the curve C but contracted. For manually tracking the envelope of the curve C′, there is provided another shaft screw 360 located parallel to and alongside of the shaft 355 and threadedly carrying a non-rotatable collar 361 with a marker or pointer 362 adapted to be maintained by manual control in position to generate the envelope E of the pitch curve C′. This shaft screw 360 is manually controlled in a manner to be described from a pair of manual control members 363 and 364, shown in the form of handcranks.

The mechanism is so set up that the quantities $w_2$, $a_0$, $w_1$ and $a_v$ are manually fed into the system by the handcranks 348, 350, 363 and 364 respectively, the proper values fed being assured by the proper tracking of the curves C and C′ as described. The two curves C and C′ are located in position to be easily visible to two operators respectively controlling the cranks 348, 350, 363 and 364. One operator handles the two cranks 348 and 350 while he is watching the recorded curve C. If for example, he finds that the tracking curve being generated by the marker 347 varies in frequency from the curve C generated by the marker 342, he adjusts the rate and direction of rotation of the crank 348 to make the frequency of the tracking curve correspond to that of the curve C. Similarly, he adjusts the rate and direction of rotation of the crank 350, if he finds that the tracking curve generated by the marker 347 varies in amplitude from that of curve C.

The other operator handles the two cranks 363 and 364 while he is watching the recorded curve C′, to cause the tracking curve to generate the envelope E of said recorded curve, the crank 363 being rotated at the right rate and direction to obtain the necessary frequency in his tracking curve and the crank 364 being rotated at the right rate and direction to obtain the necessary amplitude in his tracking curve.

The quantity $w_2$ fed manually into the mechanism by the crank 348 is fed into an integrator 370 and the output of this integrator is added in a differential 371 to a quantity derived from the crank 348 through a connection 369. The integrator 370 and the differential 371 constitute what is known as an aided tracking unit. In this unit, the connection 369 between the crank 348 and the input of the differential 371 has a proper gear ratio which is determined experimentally by the ease of tracking to arrive at an optimum gear ratio suitable for all conditions encountered. With such a gear ratio, there is produced at the output of the differential 371 the quantity $w_2 t + \phi_2$ when the curve C is accurately tracked.

The quantity $w_2 t + \phi_2$ and the quantity $$a_0 + a_v \sin (w_1 t + \phi_1)$$

corresponding to the value of one side of the Equation 82 of the envelope curve obtained in a manner to be described, are fed into a component resolver 372 to obtain the quantity $P_0$. This quantity $P_0$ rotates the shaft screw 345 at a rate and direction to track the curve C in the manner described.

The quantity $w_1$ fed manually into the mechanism by the crank 363 is applied to a multiplier 377 in conjunction with the quantity $T_p$ (predicted time) derived from the prediction computer as described in the aforesaid application to obtain $w_1 T_p$ which is applied to a differential 378. At the same time $w_1$ applied to an aided tracking unit similar to the aided tracking unit 369, 370 and 371, and comprising an integrator 380 and a differential 381 with a connection 379 of proper gear ratio between the crank 363 and the differential 381 results in the quantity $w_1 t + \phi_1$. The latter quantity is added to $w_1 T_p$ in the differential 378, and the output $w_1 t + w_1 T_p + \phi_1$ is applied to a component resolver 382 in conjunction with the quantity $a_v$ manually fed into the mechanism by the crank 364, to obtain from said component resolver the quantity $a_v \sin (w_1 t + w_1 T_p + \phi_1)$.

The quantity $w_1 t + \phi_1$ is also fed into a component resolver 383 in conjunction with the manually applied quantity $a_v$ to produce $a_v \sin (w_1 t + \phi_1)$ and this latter quantity is added to the manually applied quantity $a_0$ in a differential 384 to produce the quantity $$a_0 + a_v \sin (w_1 t + \phi_1)$$

corresponding to the value of one side of the Equation 82 of the envelope. This latter quantity is applied to the component resolver 372 as already described and also to the shaft screw 360 to rotate said screw and thereby generate the tracking envelope E.

The quantity $T_p$ is fed into multiplier 385 in conjunction with the quantity $w_2$ and the product is applied to a differential 386 with the quantity $w_2 t + \phi_2$ to obtain the quantity $w_2 t + w_2 T_p + \phi_2$ which is fed into a component resolver 387. The output $a_0 + a_v \sin (w_1 t + w_1 T_p + \phi_1)$ obtained from the component resolver 382 as described, is added to the manually applied quantity $a_0$ in a differential 388 and the resulting sum is applied to the component resolver 387 as the other input to obtain the quantity $[a_0 + a_v \sin (w_1 t + w_1 T_p + \phi_1)] \sin (w_2 t + w_2 T_p + \phi_2)$ which is equal to the desired predicted pitch angle $P_p$ in accordance with Equation 84. This quantity applied to the shaft screw 351 generates the predicted pitch curve D, by which the accuracy of pitch prediction can be determined, as the recorded curve C catches up with said curve D.

The mathematics and mechanisms employed in determining the value of pitch angle at the future time $T_p$ is applicable to the determination of the value of the deck height or heave at the future time $T_p$. For that purpose, continuous measurement of the present value of the deck height and its supply as a physical quantity are obtained from a heavemeter operating as an accelerometer and shown and described in the aforesaid application. This quantity is operated on as was the quantity $P_1$ in the mechanism of the drawing, to obtain the deck height at the future time $T_p$.

Although the present invention has been described as embodied in a method and mechanism for determining pitch angle and heave (deck height), in its broader aspects, the invention is applicable to the determination of a future quantity in a fluctuating system, where the system does not follow continuously a set mathematical form but is changing in mathematical form.

In the following claims, unless otherwise indicated, $P_0$ and $P_p$ represent broadly the present and future quantities respectively in any fluctuating system.

What is claimed is:

1. A method of continuously predicting the value $P_p$ at a future predetermined time $T_p$ of a fluctuating system following the equation $$P_0 = [a_0 + a_v \sin (w_1 t + \phi_1)] \sin (w_2 t + \phi_2)$$

wherein $P_0$ represents the present value of the system, $a_0$ represents the amplitude of the variation in the values of the system, $w_1$ and $w_2$ represent the angular velocities of the assumed sine wave components of the system, $\phi_1$ and $\phi_2$ represent the phase angles of said sine wave components and $t$ represents the present running time, which method comprises continuously producing a running record curve of the present value of said system, and continuously tracking said record curve and simultaneously tracing a running envelope curve of the fluctuating system through mechanization of said equation and the equations $$a_s = a_0 + a_1 \sin(w_1 t + \phi_1)$$
$$P_p = [a_0 + a_1 \sin(w_1 t + w_1 T_p + \phi_1)] \sin(w_2 t + w_2 T_p + \phi_2)$$

and through continuous manual adjustment of the input quantities $w_1$, $w_2$, $a_0$ and $a_v$ to obtain the quantity $P_p$.

2. A method of continuously predicting the pitch angle of a floating deck at a future predetermined time as described in claim 1, wherein $P_0$ represents the present pitch angle and $P_p$ the predicted pitch angle.

3. A method of continuously predicting the height of a floating deck at a future predetermined time as described in claim 1, wherein $P_0$ represents the deck height and $P_p$ the predicted deck height.

4. A device for continuously predicting the value $P_p$ at a future predetermined time $T_p$ of a fluctuating system following the equation $$P_0 + [a_0 + a_v \sin(w_1 t + \phi_1)] \sin(w_2 t + \phi_2)$$

wherein $P_0$ represents the present value of the system, $a_0$ represents the average amplitude of the system, $a_v$ represents the amplitude of the variation system, $w_1$ and $w_2$ represent the angular velocities of the assumed sine wave components of the system, $\phi_1$ and $\phi_2$ represent the phase angles of said sine wave components and $t$ represents the present running time, said device comprising means for producing two running record curves of the present value of said system, and means for mechanizing said equation and the equations $$a_s = a_0 + a_1 \sin(w_1 t + \phi_1)$$
$$P_p = [a_0 + a_1 \sin(w_1 t + w_1 T_p + \phi_1)] \sin(w_2 t + w_2 T_p + \phi_2)$$

and having manually adjustable input feeding means and means controlled by the adjustments of said input feeding means for tracking one of said record curves and for tracing the envelope of the other record curve to obtain the quantity $P_p$.

5. A device for continuously predicting the pitch angle of a floating deck at a future predetermined time as described in claim 4, wherein $P_0$ represents the present pitch angle an $P_p$ the predicted pitch angle.

6. A device for continuously predicting the height of a floating deck at a future predetermined time as described in claim 4, wherein $P_0$ represents the present deck height and $P_p$ the predicted deck height.

References Cited in the file of this patent

UNITED STATES PATENTS 2,669,500    Och et al. _____ Feb. 16, 1954